F. STUTZMAN.
CUTTER HEAD.
APPLICATION FILED JAN. 26, 1911.

1,009,352.

Patented Nov. 21, 1911.

Inventor.
Frank Stutzman.

UNITED STATES PATENT OFFICE.

FRANK STUTZMAN, OF WILLIAMSPORT, PENNSYLVANIA.

CUTTER-HEAD.

1,009,352.

Specification of Letters Patent. Patented Nov. 21, 1911.

Application filed January 26, 1911. Serial No. 604,902.

*To all whom it may concern:*

Be it known that I, FRANK STUTZMAN, citizen of the United States, residing at Williamsport, Pennsylvania, have invented certain new and useful Improvements in Cutter-Heads, of which the following is a specification.

My invention relates to a device for holding cutters in place, and has for its object a very simple but effective means for holding the cutter securely but at the same time of permitting all necessary adjustments very readily.

Figure 1:
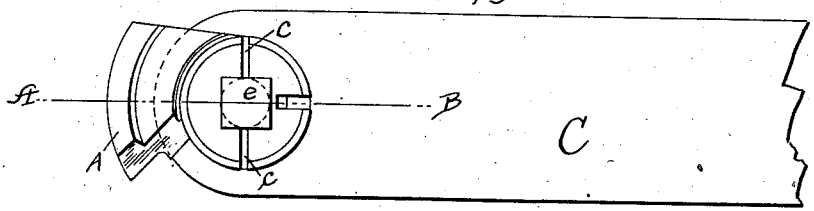
Figure 2:
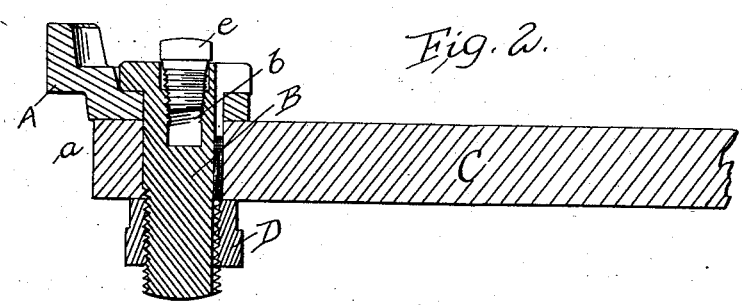
Figure 3:
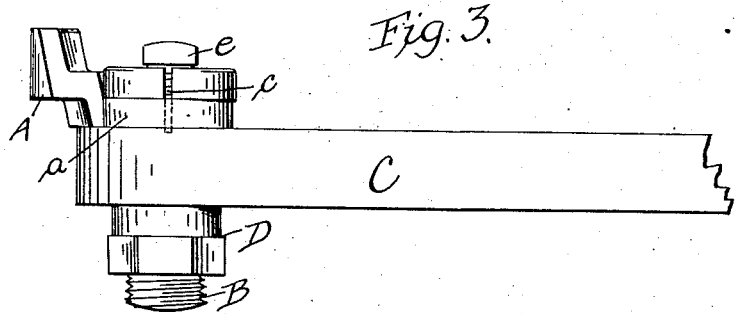

In the accompanying drawings—Figure 1 is an elevation of a cutter with its support and the holding and adjusting means of my invention. Fig. 2 is a sectional view taken on the line A—B. Fig. 3 is an elevation of the cutter with its parts.

In this drawing the cutter, which may be of any ordinary or improved construction, is shown at A, and this is supported upon a bolt B, the bolt passing through an opening in the base $a$ of the cutter, the bolt in turn being supported by the part C, of usual and ordinary construction. The bolt has a splined connection with the part C so that the parts turn together and a nut D holds the bolt securely in place upon the part C.

In order to hold the cutter upon the bolt, and at the same time permit its adjustment the bolt is provided with a central tapering screw threaded opening $b$, and is split across its head and part way down its stem, as shown at $c$. The base of the cutter fits snugly between the part C and the head of the bolt, and it turns with the bolt by reason of the fact that a small screw threaded plug $e$ is used fitted to the central screw threaded opening of the bolt, and as this is forced into place it has the tendency, by reason of the fact that the opening in the bolt and the plug are tapering, to spread the parts of the bolt outwardly against the periphery of the opening through the base of the cutter, and the strong frictional contact resulting holds the cutter securely and prevents displacement. When, however, it is desired to adjust the cutter for any reason the plug may be loosened and adjustment effected.

What I claim is:—

A solid bolt having a screw threaded end and an enlarged flat head at its other end, said head having a screw threaded opening passing therethrough into the upper end of its body portion and said head having slits therein extending into said opening, and a small screw-threaded expanding plug engaging said opening.

In testimony whereof, I affix my signature in presence of two witnesses.

FRANK STUTZMAN.

Witnesses:
JACOB J. BENDER,
JOHN PLANKENHORN.

---

Copies of this patent may be obtained for five cents each, by addressing the "Commissioner of Patents, Washington, D. C."